United States Patent
Kimura et al.

(10) Patent No.: US 12,085,726 B2
(45) Date of Patent: Sep. 10, 2024

(54) INFORMATION PROCESSING DEVICE AND INFORMATION PROCESSING METHOD

(71) Applicant: SONY GROUP CORPORATION, Tokyo (JP)

(72) Inventors: Jun Kimura, Tokyo (JP); Hirotake Ichikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/755,911

(22) PCT Filed: Nov. 10, 2020

(86) PCT No.: PCT/JP2020/041886
§ 371 (c)(1),
(2) Date: May 11, 2022

(87) PCT Pub. No.: WO2021/100553
PCT Pub. Date: May 27, 2021

(65) Prior Publication Data
US 2022/0382065 A1   Dec. 1, 2022

(30) Foreign Application Priority Data
Nov. 20, 2019   (JP) ................................ 2019-209323

(51) Int. Cl.
*G02B 27/01*   (2006.01)
*G06F 3/01*   (2006.01)

(52) U.S. Cl.
CPC ........ *G02B 27/0179* (2013.01); *G02B 27/017* (2013.01); *G06F 3/017* (2013.01); *G02B 2027/0178* (2013.01)

(58) Field of Classification Search
None
See application file for complete search history.

(56) References Cited

U.S. PATENT DOCUMENTS

2012/0120103 A1*  5/2012  Border ............... G02B 27/017
                                                 345/633
2012/0306940 A1* 12/2012  Machida .......... G02B 27/0176
                                                 345/107
(Continued)

FOREIGN PATENT DOCUMENTS

CN   102809821 A   12/2012
CN   105026983 A   11/2015
(Continued)

OTHER PUBLICATIONS

International Search Report and Written Opinion of PCT Application No. PCT/JP2020/041886, issued on Dec. 28, 2020, 09 pages of ISRWO.

*Primary Examiner* — Parul H Gupta
(74) *Attorney, Agent, or Firm* — CHIP LAW GROUP

(57) ABSTRACT

An information processing device according to an embodiment includes a detection unit, a determination unit, and a display control unit. The detection unit detects a wearing state of a wearer with respect to a display device that has optical transparency and projects a plurality of content images duplicated from a single content image toward the eyeballs of the wearer. The determination unit determines whether or not the mounting misalignment is occurring with the wearer on the basis of the detection result of the wearing state detected by the detection unit. In a case where the determination unit determines that the mounting misalignment is occurring, the display control unit displays a notification regarding the mounting misalignment on the display device.

14 Claims, 8 Drawing Sheets

(56) References Cited

U.S. PATENT DOCUMENTS

| | | | | |
|---|---|---|---|---|
| 2014/0191927 A1* | 7/2014 | Cho | ............... | G06F 3/011 |
| | | | | 345/8 |
| 2018/0246334 A1* | 8/2018 | Yajima | ............... | G06F 3/14 |

FOREIGN PATENT DOCUMENTS

| | | | |
|---|---|---|---|
| CN | 107820592 | A | 3/2018 |
| EP | 2530510 | A2 | 12/2012 |
| JP | 2010-044326 | A | 2/2010 |
| JP | 2012-252091 | A | 12/2012 |
| JP | 2018-506744 | A | 3/2018 |
| JP | 2018-142857 | A | 9/2018 |
| KR | 10-2014-0090968 | A | 7/2014 |
| KR | 10-2017-0139510 | A | 12/2017 |
| WO | 2016/134038 | A1 | 8/2016 |
| WO | 2017/051595 | A1 | 3/2017 |
| WO | 2019/130900 | A1 | 7/2019 |

\* cited by examiner

FIG.9
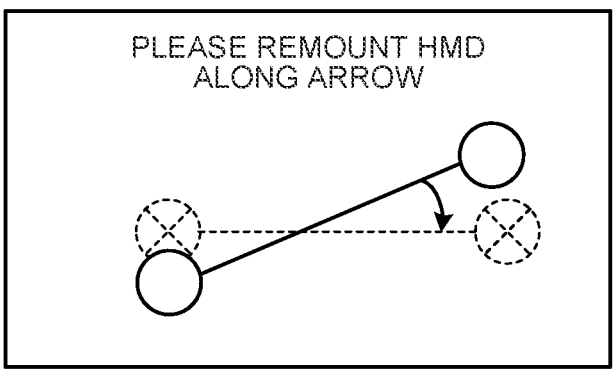
FIG.10
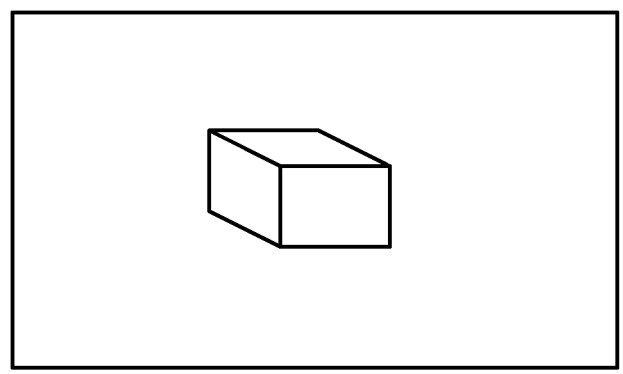
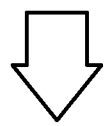
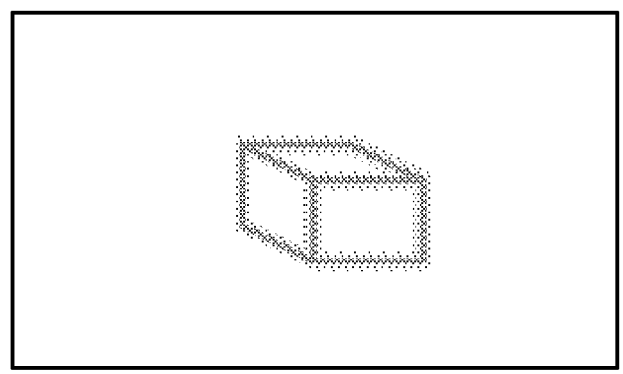

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/041886 filed on Nov. 10, 2020, which claims priority benefit of Japanese Patent Application No. JP 2019-209323 filed in the Japan Patent Office on Nov. 20, 2019. Each of the above-referenced applications is hereby incorporated herein by reference in its entirety.

FIELD

The present invention relates to an information processing device, an information processing method, and an information processing program.

BACKGROUND

In the related art, in head mounted displays, there are information processing devices that execute calibration of a display position in a head mounted display on the basis of a detection result in which a line of sight of a user is detected.

In such information processing devices, calibration is executed to match the motion of eyeballs of a wearer while a marker for the calibration is displayed on the head mounted display (see, for example, Patent Literature 1).

In addition, there are also display devices that cause light in a light-guiding plate to be emitted from the light-guiding plate while causing the light to be reflected and diffracted for a plurality of times by a diffraction grating member in order to widen an area (eyebox) in which a wearer can observe an image in the head mounted display (see, for example, Patent Literature 2).

CITATION LIST

Patent Literatures

Patent Literature 1: WO 2017-051595 A
Patent Literature 2: JP 2010-44326 A

SUMMARY

Technical Problem

In the prior art, a display configured to duplicate and project a content image in order to widen an eyebox allows, to some extent, a mounting misalignment in the wearer, that is, a misalignment of the display based on an optimum arrangement with respect to the eyeballs. As a result, such a head mounted display makes it difficult for the wearer to notice the mounting misalignment. For this reason, if calibration is performed in a state where there is a mounting misalignment of the head mounted display, there is a possibility that an error in the calibration increases.

The present invention has been made in view of the above, and an object of the present invention is to provide an information processing device, an information processing method, and an information processing program capable of eliminating a mounting misalignment of a display device that provides a so-called eyebox.

Solution to Problem

In order to solve the above-described disadvantage and to achieve the object, an information processing device according to an aspect of an embodiment includes a detection unit, a determination unit, and a display control unit. The detection unit detects a wearing state of the wearer with respect to a display device that has optical transparency and projects a plurality of content images duplicated from a single content image toward the eyeballs of the wearer. The determination unit determines whether or not a mounting misalignment with the wearer is occurring on the basis of a detection result of the wearing state detected by the detection unit. The display control unit displays a notification regarding the mounting misalignment on the display device in a case where the determination unit determines that a mounting misalignment is occurring.

Advantageous Effects of Invention

According to one aspect of the embodiment, even in a case where there is a mounting misalignment of a level that a wearer does not notice, the mounting misalignment of the display device can be easily eliminated.

BRIEF DESCRIPTION OF DRAWINGS

FIG. 9 is a diagram illustrating an example of notification regarding mounting misalignment.
FIG. 10 is a diagram illustrating an example of notification regarding mounting misalignment.

DESCRIPTION OF EMBODIMENTS

Hereinafter, embodiments of the present disclosure will be described in detail on the basis of the drawings. Note that in each of the following embodiments, the same parts are denoted by the same symbols, and redundant description will be omitted.

Figure 1:
FIG. 1 is a diagram illustrating an example of the appearance of a display device according to an embodiment.
Figure 2:
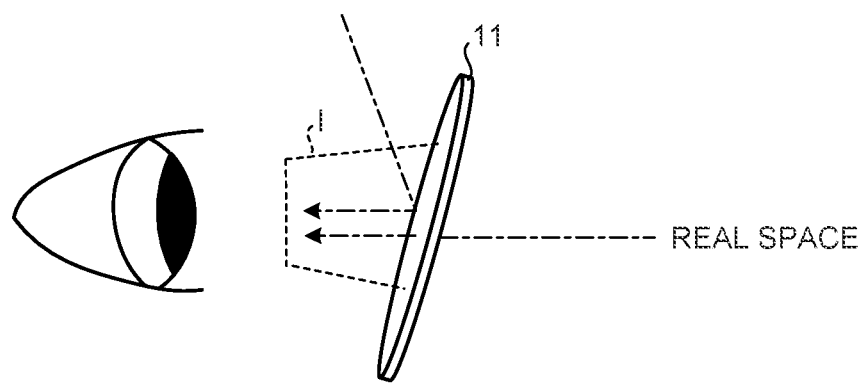
FIG. 2 is a conceptual diagram of an eyebox.
Figure 3:
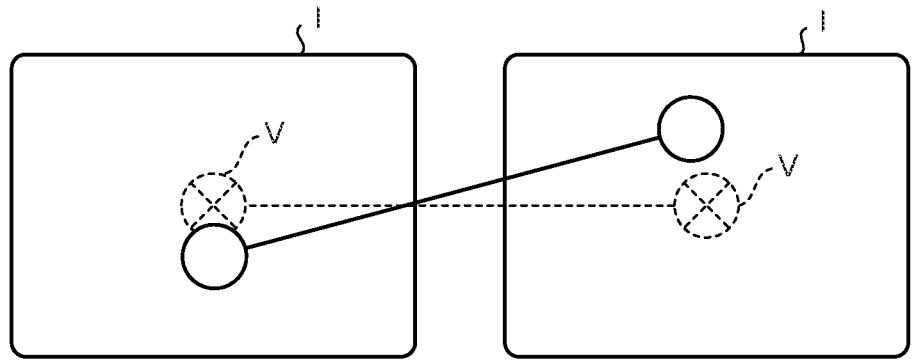
FIG. 3 is a schematic diagram of a mounting misalignment.

First, an overview of a display device according to an embodiment will be described by referring to FIGS. 1 to 3. FIG. 1 is a diagram illustrating an example of the appearance of the display device according to the embodiment. FIG. 2 is a conceptual diagram of an eyebox. FIG. 3 is a schematic diagram of a mounting misalignment.

In the example illustrated in FIG. 1, a display device 10 delivers augment reality (AR) in which a content image such as a virtual object is superimposed on the real world and thereby represented to a user. Note that, hereinafter, the display device 10 may also be referred to as a head mounted display (HMD). Furthermore, the content image may be a still image or a moving image.

As illustrated in FIG. 1, the display device 10 includes display units 11 and is disposed at a position in front of both eyes of a user (hereinafter referred to as a wearer) so that the display units 11 are positioned in front of the wearer when worn by the wearer. Note that the display device 10 is not limited to a binocular type and may be a monocular type.

Furthermore, as illustrated in FIG. 2, the display device 10 is a so-called optical see-through type display device that projects the duplicated content image toward the eyeballs of the wearer and transmits light of the real world via the display units 11.

In such a display device 10, three-dimensional eyeboxes I are defined between the eyes of the wearer and the display units 11. Here, an eyebox I is an area in which an image (content image) is projected from a display unit 11 and in which the wearer can view the content image.

A display unit 11 that forms an eyebox I includes, for example, a light-guiding plate and a diffraction grating. The light-guiding plate is structured so as to propagate the content image output from a projector (light source) by total reflection. The diffraction gratings are provided on the light-guiding plates and are structured so as to project light propagated to the eyeballs of the user from a plurality of positions in the light-guiding plates in a substantially parallel manner. That is, a single content image output from the light source is duplicated as a plurality of content images and projected to the eyeballs of the user from a plurality of positions in the light-guiding plates. Note that the display device 10 of the present disclosure is not limited to this configuration and is only required to include a display unit that widens the area in which the content image can be observed by the wearer by projecting the plurality of duplicated content images.

For example, as illustrated in FIG. 3, in a display device 10, a virtual camera V is set at the center of an eyebox I, and the content image is projected from the display unit 11 using the virtual camera V as a reference, thereby providing the content image to the wearer. Note that the virtual camera V here indicates the optimum position of an eyeball of the wearer, and in the display device 10, the content image is projected from a display unit 11 using the virtual camera V as the reference.

At this point, if the eyes of the wearer are within the eyeboxes I, the content image of the same angle of view can be viewed. Therefore, in the optical see-through type display device, even if a mounting misalignment of the HMD occurs, if the eyes of the wearer are in the eyeboxes I, although the display positions of the content image are shifted, the wearer is less likely to notice the mounting misalignment since the wearer can see the content image of the same angle of view.

Note that, in a case where a part of an eyeball of the wearer is deviates from the eyebox I, the content image is projected on the eyeball of the wearer with a missing part, but even in this case, it is not easy for the wearer to recognize the mounting misalignment.

For such a problem, the information processing device according to the embodiment detects the mounting misalignment and displays a notification regarding the mounting misalignment on the display units 11 in a case where the mounting misalignment is detected. That is, in the information processing device according to the embodiment, a mounting misalignment is detected, and in a case where the mounting misalignment is detected, the wearer is prompted to re-mount the display device 10.

Hereinafter, the information processing device, an information processing method, and an information processing program according to an embodiment will be described in detail.

Figure 4:
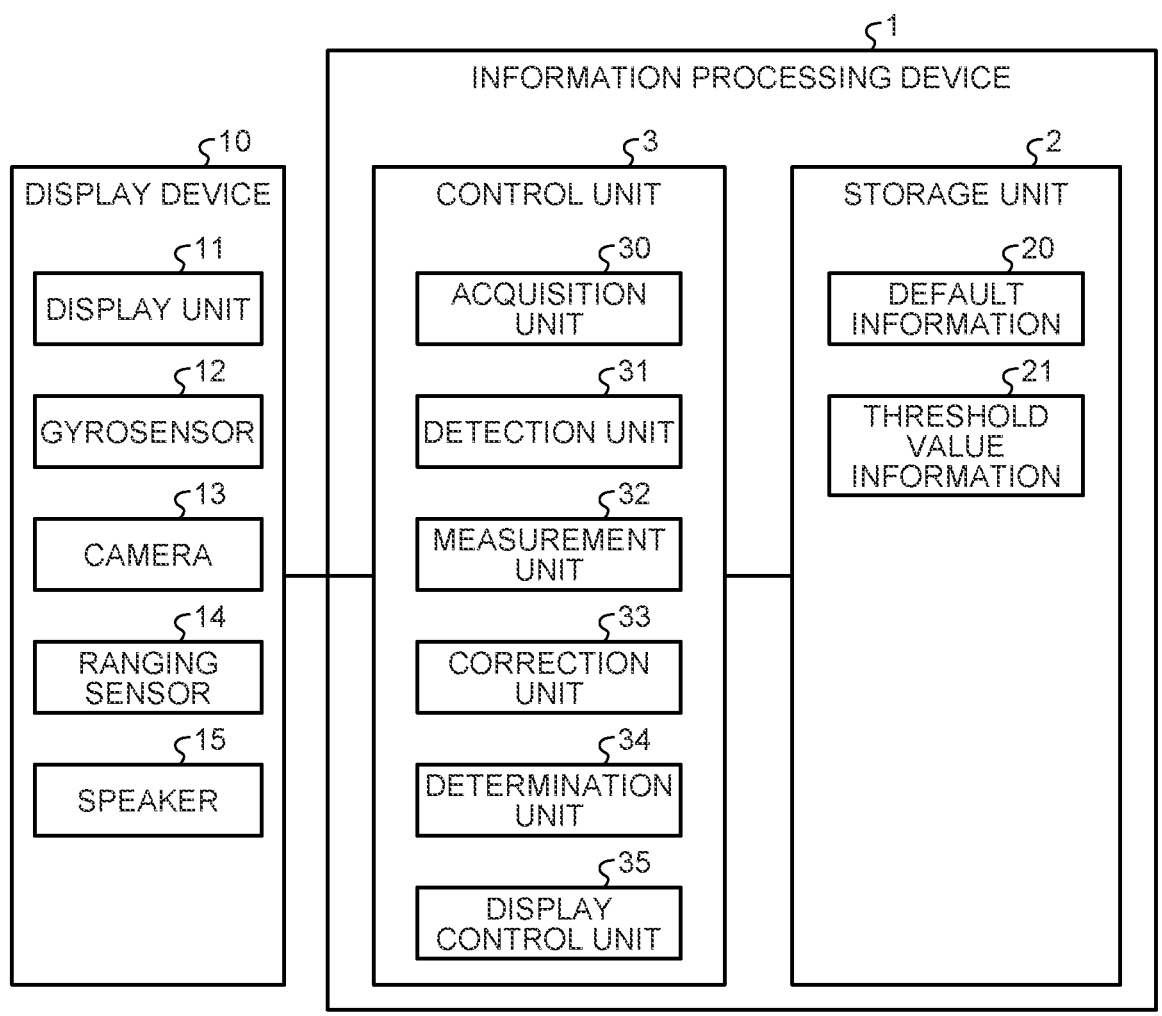
FIG. 4 is a block diagram of an information processing device according to the embodiment.

Next, a configuration example of the information processing device 1 according to the embodiment will be described by referring to FIG. 4. FIG. 4 is a block diagram of the information processing device according to the embodiment. Note that the display device 10 is also illustrated in FIG. 4. Furthermore, the information processing device 1 and the display device 10 can transmit and receive data bidirectionally in a wireless or wired manner.

First, the display device 10 will be described. As illustrated in FIG. 4, the display device 10 includes display units 11, a gyrosensor 12, a camera 13, a ranging sensor 14, and a speaker 15. A display unit 11 includes, for example, a half mirror or the like, has a light transmission type display surface (lens), and displays a content image input from the information processing device 1. For example, the display unit 11 projects a content image displayed on a display (not illustrated) toward the eyeballs of the wearer by repeating total reflection in the lens.

The gyrosensor 12 detects angular velocities of three axes for detecting the motion of the display device 10. As described above, since the display device 10 is an HMD, the gyrosensor 12 detects a change in the posture of the wearer of the display device 10 and outputs a posture signal corresponding to the detected change in the posture to the information processing device 1.

The camera 13 includes an image sensor and captures an image ahead of the display device 10. For example, the camera 13 has an angle of view that enables imaging the motion of the hands of the wearer and outputs the captured camera image to the information processing device 1.

The ranging sensor 14 is an example of a sensor that performs sensing of the surrounding environment of the display unit 11 and is, for example, a time-of-flight (ToF) sensor. The ranging sensor 14 mainly measures the distance to the hands of the wearer. Note that, instead of the ranging sensor 14, the image sensor of the camera 13 may be regarded as a sensor that performs sensing of the surrounding environment. That is, in a case where the distance to a gesture operation of the wearer can be measured by image analysis, the function of the ranging sensor 14 may be performed by the image sensor.

The speaker 15 is an example of an audio output unit and outputs audio corresponding to the content image. Furthermore, in a case where the information processing device 1 determines that there is a mounting misalignment of the HMD, the speaker 15 can also output a voice for notifying the mounting misalignment. Note that earphones connected in a wired or wireless manner may be used as the audio output unit.

Next, the information processing device 1 will be described. As illustrated in FIG. 4, the information processing device 1 includes a storage unit 2 and a control unit 3. Note that the information processing device 1 may include a communication unit (not illustrated) for performing wireless or wired communication with an external device and an operation unit (not illustrated) for receiving an operation by a user.

The storage unit 2 is implemented by, for example, a semiconductor memory element such as a RAM or a flash memory or a storage device such as a hard disk or an optical disk. In the example illustrated in FIG. 4, the storage unit 2 stores default information 20 and threshold value information 21.

The default information 20 includes, for example, information related to a correction coefficient based on a misalignment between content coordinates that are coordinates in the real space indicated by the display position of the content image displayed on the display units 11 and gesture coordinates indicated by a gesture operation of the wearer, information indicating a relationship between the content coordinates and the gesture coordinates, and other information. The default information 20 is registered by the control unit 3 at the time of setting defaults or every time a wearer wears the HMD.

The threshold value information 21 is information related to a threshold value at the time of detecting a mounting misalignment. Information regarding threshold values related to the distance or angle is stored in the storage unit 2 as the threshold value information 21.

The control unit 3 is implemented by, for example, a central processing unit (CPU), a micro processing unit (MPU), or the like executing a program stored inside the information processing device 1 using a random access memory (RAM) or the like as a work area. The control unit 3 is also a controller and may be implemented by, for example, an integrated circuit such as an application specific integrated circuit (ASIC) or a field programmable gate array (FPGA).

As illustrated in FIG. 4, the control unit 3 includes an acquisition unit 30, a detection unit 31, a measurement unit 32, a correction unit 33, a determination unit 34, and a display control unit 35 and implements or executes the functions or actions of information processing described below. Note that the internal configuration of the control unit 3 is not limited to the configuration illustrated in FIG. 4 and may be another configuration as long as information processing described below is performed. Note that the control unit 3 may be connected to a predetermined network in a wired or wireless manner using, for example, a network interface card (NIC) or the like and receive various types of information from an external server or the like via the network.

The acquisition unit 30 acquires various types of information input from the display device 10. Specifically, the acquisition unit 30 acquires a posture signal from the gyrosensor 12 and acquires a camera image from the camera 13.

The detection unit 31 detects a wearing state of the wearer with respect to the display device that has optical transparency and projects a plurality of content images duplicated from a single content image toward the eyeballs of the wearer. The detection unit 31 detects a positional relationship between the eyeballs of the wearer and the eyeboxes I as the wearing state.

Specifically, the detection unit 31 detects a gesture operation on the content image by the wearer on the basis of the camera image captured by the camera 13 and detects the wearing state on the basis of a gesture operation that has been detected.

For example, the detection unit 31 detects a hand of the wearer by performing predetermined image analysis on the camera image and detects a gesture operation by tracking the motion of the hand. Note that examples of the gesture operation include various operations such as an operation of touching the content image and an operation of grasping the content image. At this point, the detection unit 31 may set only the gesture operation associated with the content image being displayed on the display units 11 as a detection target of the gesture operation.

When detecting the gesture operation, the detection unit 31 requests the measurement unit 32 to measure gesture coordinates, which are three-dimensional coordinates of the gesture operation. As a result, the measurement unit 32 described later measures the gesture coordinates and notifies the detection unit 31 of the gesture coordinates that have been measured.

Then, the detection unit 31 detects the wearing state on the basis of the gesture coordinates. That is, the detection unit 31 estimates the three-dimensional position of the content image visible from the wearer on the basis of the gesture coordinates and also detects the positional relationship between the eyeballs of the wearer and the eyeboxes I as the wearing state on the basis of the three-dimensional position that has been estimated. The information regarding the wearing state detected by the detection unit 31 is notified to the determination unit 34.

The measurement unit 32 measures gesture coordinates, which are three-dimensional coordinates of the gesture operation, based on sensor information obtained by measuring the surrounding environment of the display units 11. Specifically, for example, in a case where the detection unit 31 detects the gesture operation on the content image, the measurement unit 32 measures the distance to the hand of the wearer performing the gesture operation on the basis of the detection result of the ranging sensor 14.

Thereafter, the measurement unit 32 measures gesture coordinates that are three-dimensional coordinates of the gesture operation by using the installation position of the display device 10 (the camera 13 or the ranging sensor 14) as reference coordinates. Such a three-dimensional coordinate system is a coordinate system that changes depending on the attitude or the position of the display device 10 and may also be referred to as a local coordinate system. Note that the measurement unit 32 may measure the gesture coordinates by performing predetermined image analysis on the camera image captured by the camera 13.

At the time of default setting, the correction unit 33 corrects the display position of the content image displayed on the display units 11 with respect to the gesture coordinates. Note that the default setting herein refers to the first time of mounting the HMD by the wearer; however, it may be set to mean every time of mounting the HMD by the wearer.

Specifically, at the time of default setting, a content image related to the user interface (UI) for default setting is displayed on the display units 11, and the correction unit 33 corrects the display position of the content image on the basis of gesture coordinates of a gesture operation for the UI.

That is, the correction unit 33 can appropriately display the content image for individual wearers by correcting misalignment of the display position or the like of the content image caused by individual differences of the wearers.

Figure 5:
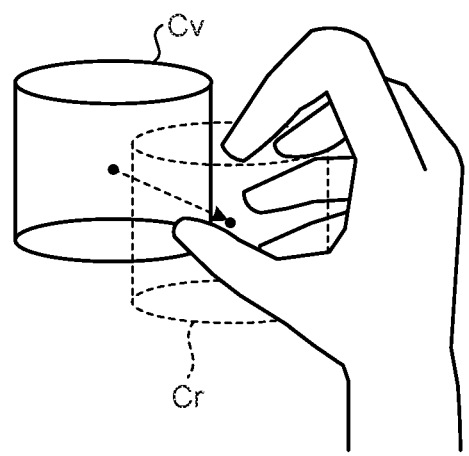
FIG. 5 is a conceptual diagram of a correction process by a correction unit according to the embodiment.
Figure 6:
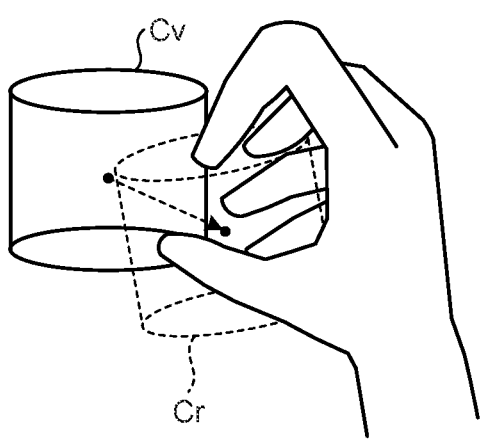
FIG. 6 is a conceptual diagram of the correction process by the correction unit according to the embodiment.

FIGS. 5 and 6 are conceptual diagrams of a correction process by the correction unit 33 according to the embodiment. Note that, in FIG. 5, a content image actually viewed by the wearer via the display units 11 is illustrated as real content Cr, and a content image displayed on the display units 11 with reference to the virtual cameras V illustrated in FIG. 2 is illustrated as display content Cv.

In a state where the display content Cv is displayed, the information processing device 1 prompts the wearer to perform an operation such as touching the display content Cv. At this point, in a case where the display content Cv and the real content Cr substantially coincide with each other, that is, in a case where the display content Cv and the coordinates of the gesture operation substantially coincide with each other, the process by the correction unit 33 is unnecessary.

Furthermore, as illustrated in FIG. 5, in a case where there is a misalignment between the display content Cv and the real content Cr, the wearer performs a gesture operation of touching the real content Cr which is away from the display content Cv.

At this point, the correction unit 33 estimates the three-dimensional coordinates of the real content Cr on the basis of the gesture coordinates of the gesture operation and calculates the misalignment between the real content Cr and the display content Cv on the basis of the three-dimensional coordinates that have been estimated and the content coordinates which are the three-dimensional coordinates of the display content Cv.

For example, the correction unit 33 calculates a correction coefficient for matching the display content Cv with the real content Cr on the basis of the misalignment that has been calculated and stores the correction coefficient in the storage unit 2 as the default information 20. Thereafter, the display control unit 35 described later updates the display position of the display content Cv on the basis of the correction coefficient and corrects the display position of the display content Cv by performing the above process until the display content Cv and the real content Cr substantially coincide with each other.

Then, in subsequent processes, the information processing device 1 can display the content image at a display position suitable for the wearer by correcting the display position of the content image using the correction coefficient that has been finally determined.

Note that, although one piece of display content Cv and one corresponding piece of real content Cr are illustrated in FIG. 5 for convenience of description, the correction unit 33 may calculate the correction coefficient on the basis of a plurality of pieces of display content Cv.

In this case, it is preferable that the correction unit 33 calculate the correction coefficient on the basis of a plurality of pieces of display content Cv displayed at different display positions and corresponding real content Cr.

Furthermore, as illustrated in FIG. 6, in a case where the misalignment between the display content Cv and the real content Cr includes a rotation component, the correction unit 33 can also calculate a correction coefficient corresponding to the rotation component.

Furthermore, the correction unit 33 sets a threshold value on the basis of the display content Cv and the real content Cr. The threshold value here is used for determination of the mounting misalignment and is information stored in the storage unit 2 as the threshold value information 21.

For example, the correction unit 33 sets the threshold value on the basis of an error between the display content Cv and the real content Cr after the display position of the display content Cv has been corrected to coincide with the real content Cr.

For example, the correction unit 33 sets the threshold value higher as the error is larger and sets the threshold value lower as the error is smaller. In this case, by setting the threshold value higher as the error between the display content Cv and the real content Cr is larger, the allowable range for a mounting misalignment is widened.

Note that the correction unit 33 may set the threshold value higher as the misalignment between the display content Cv displayed first before correction and the real content Cr is larger and may set the threshold value lower when the misalignment between the display content Cv and the real content Cr is small. In this case, the threshold value is set lower as the eyeballs of the wearer is closer to the virtual cameras V, and the threshold value is set higher as the eyeballs of the wearer is farther from the virtual cameras V.

Note that the above method of setting the threshold value is an example, and the threshold value may be set by other methods. In this case, for example, a display unit 11 may be divided into a plurality of display areas, and a threshold value may be set for each display area.

Returning to the description of FIG. 4, the determination unit 34 will be described. The determination unit 34 determines whether or not a mounting misalignment with the wearer is occurring on the basis of the wearing state detected by the detection unit 31. The determination unit 34 determines whether or not a mounting misalignment is occurring on the basis of the content coordinates based on the display content Cv and the gesture coordinates based on the real content Cr.

Figure 7:
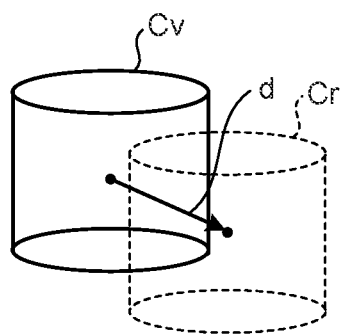
FIG. 7 is a diagram illustrating an example of a process by a determination unit according to the embodiment.

Here, a specific example of a process performed by the determination unit 34 will be described with reference to FIG. 7. FIG. 7 is a diagram illustrating an example of a process performed by the determination unit 34 according to the embodiment. As illustrated in FIG. 7, the determination unit 34 determines whether or not a mounting misalignment is occurring on the basis of an error distance d which is a distance between the content coordinates and the gesture coordinates.

More specifically, the determination unit 34 compares the error distance d with the threshold value stored in the storage unit 2 as the threshold value information 21, determines that no mounting misalignment is occurring when the error distance d is less than or equal to the threshold value, and determines that a mounting misalignment is occurring when the error distance d exceeds the threshold value.

At this point, the determination unit 34 determines whether or not the mounting misalignment is occurring on the basis of a misalignment of the rotation component between the real content Cr and the display content Cv in addition to the error distance d. That is, even in a case where the error distance d is less than or equal to the threshold value, the determination unit 34 determines that a mounting misalignment is occurring when the misalignment of the rotation component is larger than a predetermined value.

That is, the determination unit 34 determines that a mounting misalignment is occurring when the gesture operation of the wearer with respect to the display content Cv deviates from the display content Cv by more than a predetermined value. Here, since the gesture operation by the wearer is performed on the basis of the real content Cr, a misalignment between the real content Cr estimated from the gesture operation and the display content Cv substantially indicates a misalignment of the viewpoint position of the wearer with respect to the virtual cameras V.

It is conceivable that the main cause of the misalignment of the viewpoint position is based on the mounting misalignment of the HMD. Therefore, the information processing device 1 can estimate the positional relationship between the eyeballs of the wearer and the eyeboxes I by estimating the three-dimensional coordinates of the real content Cr in the real space on the basis of the gesture coordinates and comparing the three-dimensional coordinates that have been estimated with the content coordinates.

Then, in a case where the misalignment between the real content Cr and the display content Cv exceeds the threshold value, it can be determined that the relative position between the eyeballs and the eyeboxes I is deviated from the initial position, and thus, it can be determined that a mounting misalignment is occurring. As described above, the information processing device 1 can determine a mounting misalignment of the HMD by estimating the real content Cr on the basis of the gesture operation.

Furthermore, in the information processing device 1, the series of processes can be performed on the basis of a simple gesture operation such as the wearer touching the real content Cr, and thus a mounting misalignment can be easily determined every time an operation object is displayed.

In other words, the information processing device 1 can determine a mounting misalignment as needed at the timing when an operation object (UI) accompanied by a gesture operation is displayed as a content image. That is, the information processing device 1 can determine a mounting misalignment without interrupting the AR experience being provided to the wearer.

Moreover, in a case where it is determined that a mounting misalignment is occurring, the determination unit 34 notifies the display control unit 35 and causes the speaker 15 to output predetermined voice. At this point, the voice output from the speaker 15 includes guidance voice that prompts the user to remount the HMD, a warning sound indicating the mounting misalignment, or the like.

Returning to the description of FIG. 4, the display control unit 35 will be described. The display control unit 35 controls the content image to be displayed on the display devices 10 by drawing the content image and outputting an image signal related to the content image to the display devices 10.

Here, the content image is not particularly limited and may be a two-dimensional image or a three-dimensional image. Furthermore, the content image may be a still image or a moving image. In addition, the content image includes those in which the display position does not change depending on the posture of the wearer and those in which the display position changes following the posture of the wearer.

At this point, in a case where a display position or a changing object is displayed as a content image following the posture of the wearer, the display control unit 35 draws the object so as to match the change in the current position or the posture of the wearer.

In addition, when the determination unit 34 determines that a mounting misalignment is occurring, the display control unit 35 displays a notification regarding the mounting misalignment on the display units 11. Here, a specific example of the notification regarding the mounting misalignment will be described with reference to FIGS. 8 to 10.

Figure 8:
FIG. 8 is a diagram illustrating an example of notification regarding mounting misalignment.

FIGS. 8 to 10 are diagrams illustrating an example of notification regarding the mounting misalignment. Note that the example illustrated in FIG. 8 is an example of a warning image. For example, in the example illustrated in FIG. 8, a text such as "Please re-mount the HMD" and an image prompting to remount the HMD are displayed on the display units 11.

The wearer can easily recognize that the HMD is in the state of a mounting misalignment on the basis of the notification. In addition, the example illustrated in FIG. 9 illustrates a case where an axis image indicating the current amount of misalignment from a reference axis is displayed on the display units 11 in addition to a text.

Note that the reference axis here is an axis connecting the virtual cameras V corresponding to both eyes and indicates a target inclination. The axis image is an axis connecting the current positions of the both eyes and indicates the current inclination. In this case, the wearer can know, at a glance, the current degree of a mounting misalignment and how to remount the HMD by visually recognizing the axis image, and thus, the wearer can easily remount the HMD.

In addition, the example illustrated in FIG. 10 illustrates a case where the content image is blurred and thereby displayed on the display units 11 in a case where it is determined that a mounting misalignment is occurring. In this case, it is assumed that the wearer recognizes that defocusing has occurred.

For this reason, an operation of remounting the HMD in order to correct the defocus by the wearer can be expected. That is, in this case, by blurring the content image, it is possible to indirectly prompt the wearer to remount the HMD.

Therefore, in this case, it is possible to prompt the wearer to remount the HMD in a natural manner without interrupting the display of the content image that is being displayed. Note that the display control unit 35 may display the blurred image by replacing the image with an image that has been blurred by an external device or the like in a case where it is determined that a mounting misalignment is occurring.

Furthermore, in this case, the display control unit 35 may change the intensity of the blurring process depending on the degree of the mounting misalignment. In other words, the display mode of the content image may be changed depending on the degree of the mounting misalignment.

Specifically, for example, as the degree of a mounting misalignment is larger, the intensity of the blurring process is increased, thereby strongly prompting the wearer to remount the HMD. In addition, at this point, in a case where it is determined that a mounting misalignment is occurring, the intensity of the blurring process may be gradually increased with the lapse of time. That is, the intensity of the blurring process may be gradually increased after it is determined that a mounting misalignment is occurring, thereby strongly prompting to remount the HMD with the lapse of time. Furthermore, the display mode in a case where there is a mounting misalignment of the HMD is not limited to the above-described example, and the display position may be corrected by the correction unit 31.

Figure 11:
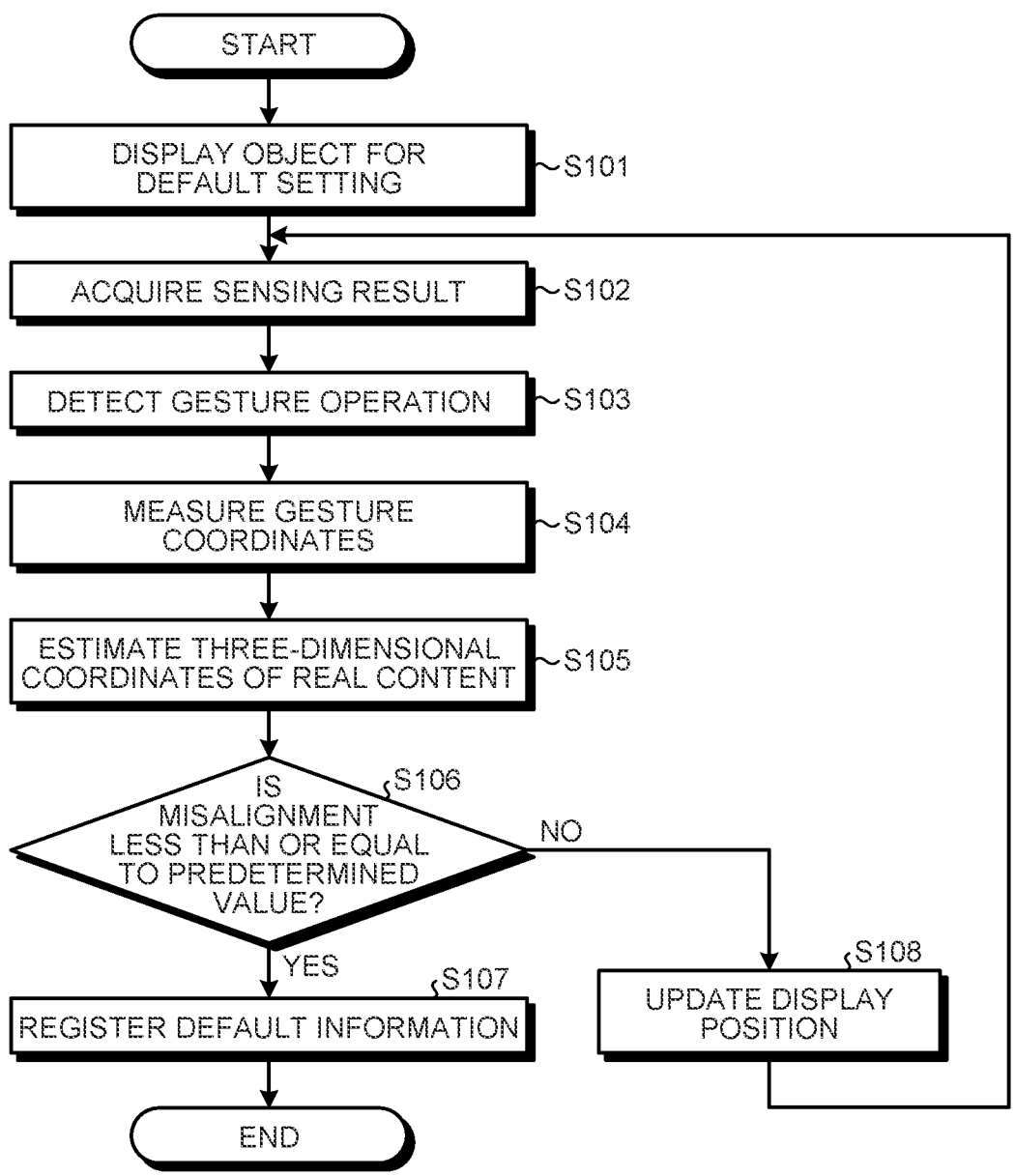
FIG. 11 is a flowchart illustrating a processing procedure executed by the information processing device according to the embodiment.
Figure 12:
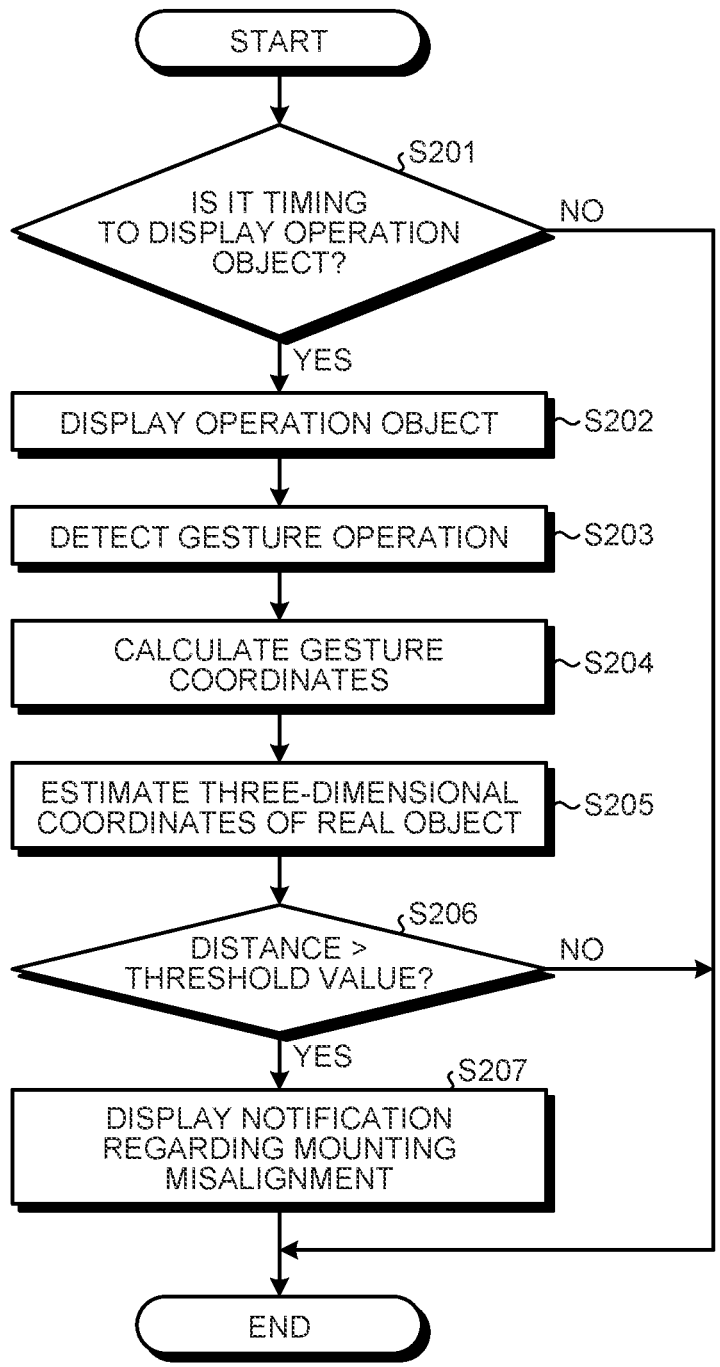
FIG. 12 is a flowchart illustrating a processing procedure executed by the information processing device according to the embodiment.

A processing procedure executed by the information processing device 1 according to the embodiment will be described by referring to FIGS. 11 and 12. FIGS. 11 and 12 are flowcharts illustrating a processing procedure executed by the information processing device 1 according to the embodiment. Note that the processing procedure illustrated below is executed by the control unit 3.

First, a processing procedure performed by the information processing device 1 at the time of default setting will be described with reference to FIG. 11. As illustrated in FIG. 11, after displaying an object for default setting (step S101), the information processing device 1 acquires a sensing result of the surrounding environment (step S102).

Subsequently, the information processing device 1 detects a gesture operation of the wearer with respect to the object displayed in step S101 on the basis of the sensing result acquired in step S102 (step S103).

Subsequently, the information processing device 1 measures gesture coordinates on the basis of the gesture operation detected in step S103 (step S104) and estimates three-dimensional coordinates of the real content on the basis of the gesture coordinates that have been measured (step S105).

Thereafter, the information processing device 1 determines whether or not a misalignment between the three-dimensional coordinates of the real content and the content coordinates indicated by the display content is less than or equal to a predetermined value (step S106), and if the misalignment is less than or equal to the predetermined value (step S106, Yes), the information processing device 1 registers the default information 20 indicating a relationship between the three-dimensional coordinates of the real content and the content coordinates of the display content (step S107) and ends the process.

Furthermore, if the misalignment exceeds the predetermined value in the determination of step S106 (step S106, No), the information processing device 1 updates the display position of the display content (step S108) and proceeds to the process of step S102 again.

Next, a series of processing procedures after the default setting by the information processing device 1 will be described with reference to FIG. 12. As illustrated in FIG. 12, the information processing device 1 determines whether or not it is the timing to display the operation object (operation UI) as the content image (step S201), and if it is the timing to display the operation object (step S202), the information processing device 1 displays the operation object (step S202).

Thereafter, the information processing device 1 detects a gesture operation with respect to the operation object (step S203) and calculates gesture coordinates corresponding to the gesture operation (step S204).

Subsequently, the information processing device 1 estimates three-dimensional coordinates of the real object on the basis of the gesture coordinates (step S205) and determines whether or not the distance between the three-dimensional position of the real object and the object coordinates indicated by the display object, which is the operation object, is larger than a threshold value (step S206).

If the distance exceeds the threshold value in the determination of step S208 (step S206), the information processing device 1 determines that a mounting misalignment is occurring and displays a notification regarding the mounting misalignment (step S207). Note that the process of step S207 is continued, for example, until the wearer remounts the HMD.

Alternatively, if it is determined in step S201 that it is not the timing to display the operation object, or if where it is determined in step S206 that the distance is less than the threshold value (step S201/step S206, No), the information processing device 1 ends the process. Note that to end the process here means to continuously display the content image that is being displayed.

[Modifications]

In the above-described embodiment, the case where the positions of the eyeballs are indirectly detected on the basis of a gesture operation to determine a mounting misalignment has been described; however, the present invention is not limited thereto. For example, the information processing device 1 may determine a mounting misalignment directly on the basis of a detection result of a sensor that detects the positions of the eyeballs.

Furthermore, in the above-described embodiment, a case where a mounting misalignment is notified by an image or audio has been described; however, for example, the mounting misalignment may be notified by vibrating the HMD. Furthermore, in the above-described embodiment, the description has been made on the premise that the wearer performs the gesture operation using a hand; however for example, other parts such as a foot can be applied.

Figure 13:
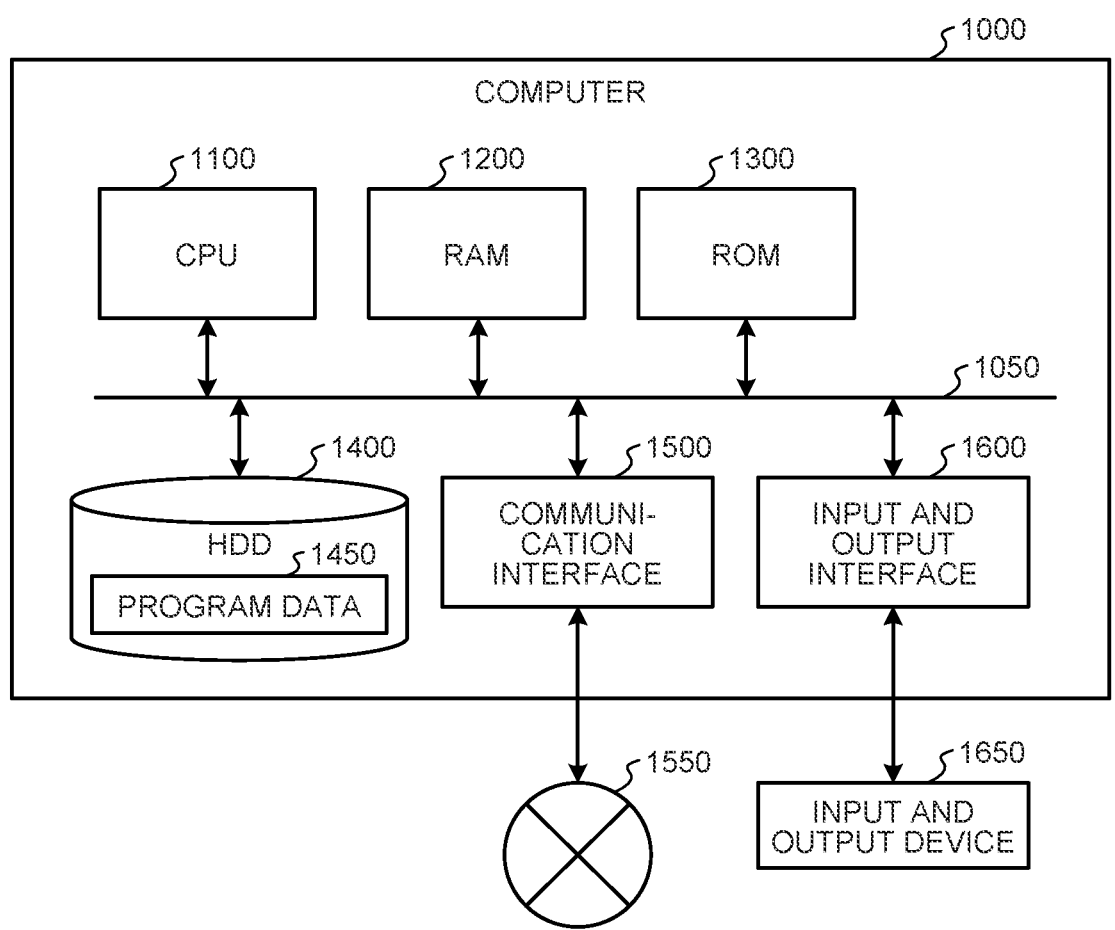
FIG. 13 is a hardware configuration diagram illustrating an example of a computer that implements the functions of the information processing device.

An information device such as the information processing devices according to the embodiments described above is implemented by, for example, a computer 1000 having a configuration as illustrated in FIG. 13. Hereinafter, the information processing device 1 according to the embodiment will be described as an example. FIG. 13 is a hardware configuration diagram illustrating an example of the computer 1000 that implements the functions of the information processing device 1. The computer 1000 includes a CPU 1100, a RAM 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads a program stored in the ROM 1300 or the HDD 1400 in the RAM 1200 and executes processes corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records a program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard or a mouse via the input and output interface 1600. In addition, the CPU 1100 transmits data to an output device such as a display, a speaker, or a printer via the input and output interface 1600. Furthermore, the input and output interface 1600 may function as a media interface that reads a program or the like recorded in a predetermined recording medium (medium). A medium refers to, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the information processing device 1 according to the embodiment, the CPU 1100 of the computer 1000 implements the function of the acquisition unit 30 by executing a program loaded on the RAM 1200. The HDD 1400 also stores a program according to the present disclosure or data in the storage unit 2. Note that although the CPU 1100 reads the program data 1450 from the HDD 1400 and executes the program data 1450, as another example, these programs may be acquired from another device via the external network 1550.

Note that the present technology can also have the following configurations.

(1)

An information processing device comprising:
a detection unit that detects a wearing state of a wearer with respect to a display device that has optical transparency and projects a plurality of content images duplicated from a single content image toward eyeballs of the wearer;

a determination unit that determines whether or not a mounting misalignment with the wearer is occurring on a basis of a detection result of the wearing state detected by the detection unit; and a display control unit that displays a notification regarding the mounting misalignment on the display device in a case where the determination unit determines that the mounting misalignment is occurring.

(2)

The information processing device according to (1), wherein the determination unit determines whether or not the mounting misalignment is occurring on a basis of eyeboxes and three-dimensional positions of the eyeballs based on the wearing state, the eyeboxes being areas in which the plurality of content images that has been duplicated is projected and defined between the eyeballs of the wearer and the display device.

(3)

The information processing device according to (2), wherein the detection unit detects a positional relationship between the eyeballs of the wearer and the eyeboxes as the wearing state by detecting a gesture operation of the wearer with respect to the content images viewed by the wearer.

(4)

The information processing device according to (3), further comprising:

a measurement unit that measures gesture coordinates indicating three-dimensional coordinates of the gesture operation on a basis of a sensing result of a sensor that performs sensing of a surrounding environment, the sensor provided at the display device, wherein the detection unit detects the wearing state on a basis of the gesture coordinates measured by the measurement unit.

(5)

The information processing device according to (4), wherein the determination unit determines that the mounting misalignment is occurring in a case where a distance between the gesture coordinates and content coordinates that are three-dimensional coordinates in the real world indicated by the content images displayed on the display device exceeds a threshold value.

(6)

The information processing device according to (5), wherein the determination unit determines whether or not the mounting misalignment is occurring on a basis of three-dimensional positions of the content images estimated from the gesture coordinates and the content coordinates.

(7)

The information processing device according to (4) or (5), further comprising:

a correction unit that corrects display positions of the content images with respect to the gesture operation at a time of default setting, wherein the determination unit determines that the mounting misalignment is occurring in a case where a relationship between the gesture operation and the display positions of the content images changes by more than a predetermined value after correction.

(8)

The information processing device according to (7), wherein the correction unit sets the threshold value on a basis of the gesture operation at the time of the default setting or after the default setting and the display positions of the content image.

(9)

The information processing device according to (7) or (8), wherein the correction unit corrects the display positions of the content image in a case where it is determined that the mounting misalignment is occurring.

(10)

The information processing device according to any one of (6) to (9), wherein the display control unit displays an operation object for gesture operation on the display device as the content images, and the detection unit detects the wearing state on a basis of the content coordinates of the operation object.

(11)

The information processing device according to (10), wherein the detection unit detects the wearing state every time the operation object is displayed, and the determination unit determines whether or not the mounting misalignment is occurring every time the detection unit detects the wearing state.

(12)

The information processing device according to any one of (1) to (11), wherein the display control unit blurs and displays the content images as a notification regarding the mounting misalignment.

(13)

The information processing device according to (12), wherein the display control unit displays the content images having a stronger level of blurring as a degree of the mounting misalignment increases.

(14)

The information processing device according to any one of (1) to (13), wherein the display control unit displays an axis image indicating a misalignment from a reference axis caused by the mounting misalignment as a notification regarding the mounting misalignment.

(15)

The information processing device according to any one of (1) to (14), wherein the display control unit displays a warning image as a notification regarding the mounting misalignment.

(16)

The information processing device according to any one of (1) to (15), wherein the determination unit outputs predetermined sound in a case where it is determined that the mounting misalignment is occurring.

(17)

An information processing method comprising the steps of:

by a computer, detecting a wearing state of a wearer with respect to a display device that has optical transparency and projects a plurality of content images duplicated from a single content image toward eyeballs of the wearer;

determining whether or not a mounting misalignment with the wearer is occurring on a basis of a detection result of the wearing state; and displaying a notification regarding the mounting misalignment on the display device in a case where it is determined that the mounting misalignment is occurring.

(18)
An information processing program for causing a computer to function as:
- a detection unit that detects a wearing state of a wearer with respect to a display device that has optical transparency and projects a plurality of content images duplicated from a single content image toward eyeballs of the wearer;
- a determination unit that determines whether or not a mounting misalignment with the wearer is occurring on a basis of a detection result of the wearing state detected by the detection unit; and
- a display control unit that displays a notification regarding the mounting misalignment on the display device in a case where the determination unit determines that the mounting misalignment is occurring.

REFERENCE SIGNS LIST

1 INFORMATION PROCESSING DEVICE
10 DISPLAY DEVICE
11 DISPLAY UNIT
30 ACQUISITION UNIT
31 DETECTION UNIT
32 MEASUREMENT UNIT
33 CORRECTION UNIT
34 DETERMINATION UNIT
35 DISPLAY CONTROL UNIT
Cr REAL CONTENT
Cv DISPLAY CONTENT
I EYEBOX

The invention claimed is:

1. An information processing device, comprising:
a central processing unit (CPU) configured to:
control a display device to project a plurality of content images duplicated from a single content image towards eyeballs of a wearer, wherein
the display device has optical transparency, and
each of the plurality of content images includes an operation object that corresponds to a real object in a real world;
detect a gesture operation of the wearer on the plurality of content images viewed by the wearer;
measure three-dimensional coordinates of the detected gesture operation;
estimate three-dimensional coordinates of the real object based on the measured three-dimensional coordinates of the detected gesture operation;
compare the estimated three-dimensional coordinates of the real object with three-dimensional coordinates of the operation object;
detect, based on the comparison of the estimated three-dimensional coordinates of the real object with the three-dimensional coordinates of the operation object, a wearing state of the wearer with respect to the display device, wherein
the wearing state corresponds to a positional relationship between the eyeballs of the wearer and eyeboxes,
the eyeboxes are areas in which the plurality of content images is projected, and
the eyeboxes are between the eyeballs of the wearer and the display device;
determine a mounting misalignment of the display device with the wearer based on the detected wearing state; and
control, based on the determined mounting misalignment, the display device to display a notification regarding the mounting misalignment.

2. The information processing device according to claim 1, wherein
the CPU is further configured to measure, based on a sensing result of a sensor that senses a surrounding environment of the display device, the three-dimensional coordinates of the detected gesture operation, and
the sensor is at the display device.

3. The information processing device according to claim 2, wherein the CPU is further configured to determine the mounting misalignment in a case where a distance between the measured three-dimensional coordinates of the detected gesture operation and the three-dimensional coordinates of the operation object exceeds a threshold value.

4. The information processing device according to claim 3, wherein the CPU is further configured to:
correct display positions of the plurality of content images with respect to the detected gesture operation at a time of default setting; and
the mounting misalignment in a case where a relationship between the detected gesture operation and the display positions of the plurality of content images changes by more than a specific value after the correction.

5. The information processing device according to claim 4, wherein the CPU is further configured to set, at the time of the default setting, the threshold value based on the detected gesture operation and the display positions of the plurality of content images.

6. The information processing device according to claim 4, wherein the CPU is further configured to correct the display positions of the plurality of content images based on the mounting misalignment.

7. The information processing device according to claim 1, wherein the CPU is further configured to:
detect the wearing state each time the operation object is displayed; and
determine the mounting misalignment each time the wearing state is detected.

8. The information processing device according to claim 1, wherein
the CPU is further configured to control the display device to blur the plurality of content images, and
the blurred plurality of content images corresponds to the notification regarding the mounting misalignment.

9. The information processing device according to claim 8, wherein the CPU is further configured to increase level of the blur of the plurality of content images based on an increase in a degree of the mounting misalignment.

10. The information processing device according to claim 1, wherein
the CPU is further configured to control the display device to display an axis image as the notification regarding the mounting misalignment, and
the axis image indicates a misalignment from a reference axis caused by the mounting misalignment.

11. The information processing device according to claim 1, wherein the CPU is further configured to control the display device to display a warning image as the notification regarding the mounting misalignment.

12. The information processing device according to claim 1, wherein the CPU is further configured to control output of a specific sound based on the mounting misalignment.

13. An information processing method, comprising:
controlling a display device to project a plurality of content images duplicated from a single content image towards eyeballs of a wearer, wherein
the display device has optical transparency, and
each of the plurality of content images includes an operation object that corresponds to a real object in a real world;
detecting a gesture operation of the wearer on the plurality of content images viewed by the wearer;
measuring three-dimensional coordinates of the detected gesture operation;
estimating three-dimensional coordinates of the real object based on the measured three-dimensional coordinates of the detected gesture operation;
comparing the estimated three-dimensional coordinates of the real object with three-dimensional coordinates of the operation object;
detecting, based on the comparison of the estimated three-dimensional coordinates of the real object with the three-dimensional coordinates of the operation object, a wearing state of the wearer with respect to the display device, wherein
the wearing state corresponds to a positional relationship between the eyeballs of the wearer and eyeboxes,
the eyeboxes are areas in which the plurality of content images is projected, and
the eyeboxes are between the eyeballs of the wearer and the display device;
determining a mounting misalignment of the display device with the wearer based on the detected wearing state; and
controlling, based on the determined mounting misalignment, the display device to display a notification regarding the mounting misalignment.

14. A non-transitory computer-readable medium having stored thereon, computer-executable instructions which, when executed by a computer, cause the computer to execute operations, the operations comprising:
controlling a display device to project a plurality of content images duplicated from a single content image towards eyeballs of a wearer, wherein
the display device has optical transparency, and
each of the plurality of content images includes an operation object that corresponds to a real object in a real world;
detecting a gesture operation of the wearer on the plurality of content images viewed by the wearer;
measuring three-dimensional coordinates of the detected gesture operation;
estimating three-dimensional coordinates of the real object based on the measured three-dimensional coordinates of the detected gesture operation;
comparing the estimated three-dimensional coordinates of the real object with three-dimensional coordinates of the operation object;
detecting, based on the comparison of the estimated three-dimensional coordinates of the real object with the three-dimensional coordinates of the operation object, a wearing state of the wearer with respect to the display device, wherein
the wearing state corresponds to a positional relationship between the eyeballs of the wearer and eyeboxes,
the eyeboxes are areas in which the plurality of content images is projected, and
the eyeboxes are between the eyeballs of the wearer and the display device;
determining a mounting misalignment of the display device with the wearer based on the detected wearing state; and
controlling, based on the determined mounting misalignment, the display device to display a notification regarding the mounting misalignment.

* * * * *